INVENTOR.
RAYMOND E. CHAPEL

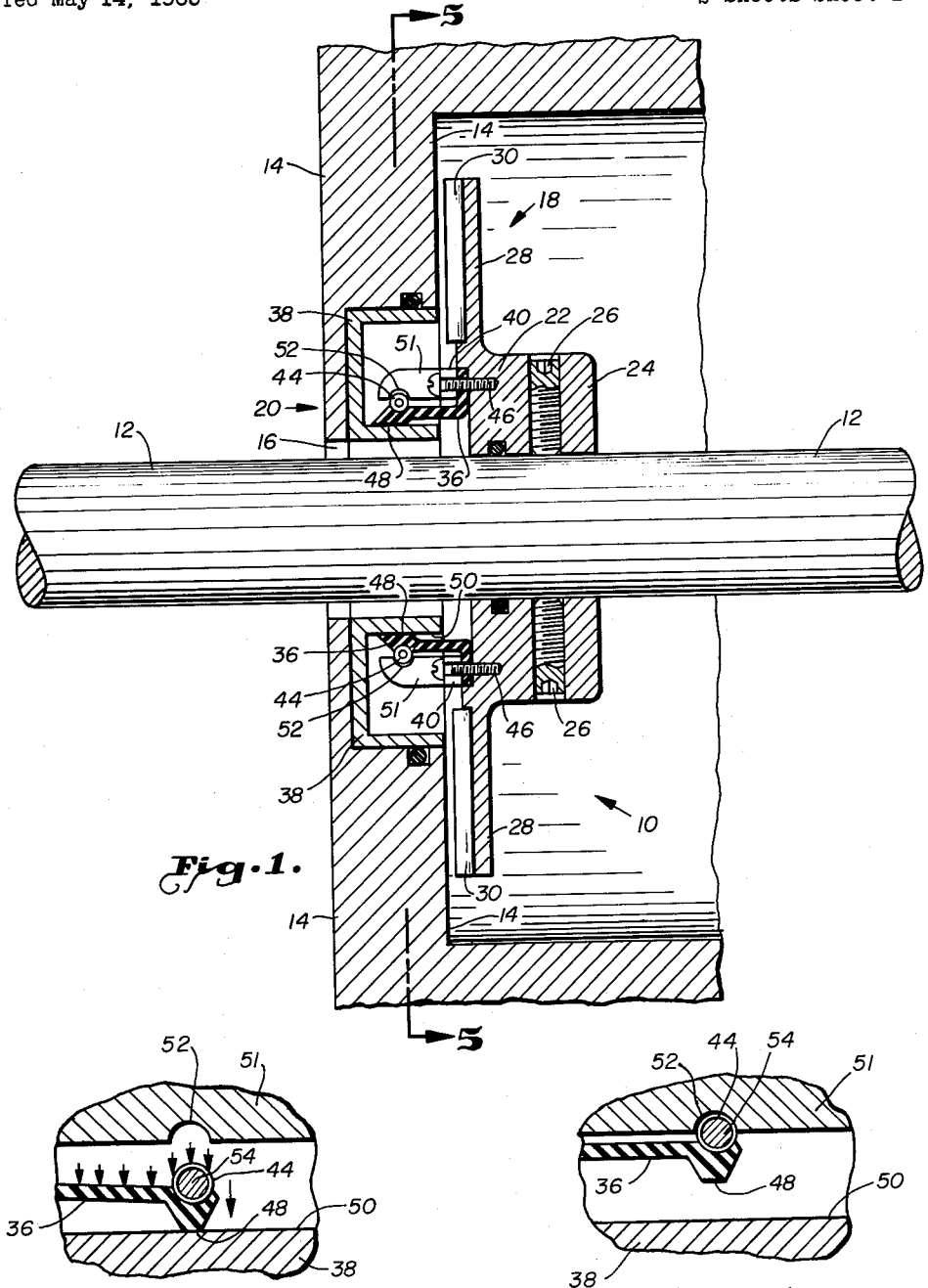

BY

ATTORNEYS

United States Patent Office 3,256,027
Patented June 14, 1966

3,256,027
FLUID SEAL
Raymond E. Chapel, Stillwater, Okla., assignor to Oklahoma State University of Agriculture & Applied Science, Stillwater, Okla., a corporation of Oklahoma
Filed May 14, 1965, Ser. No. 455,690
2 Claims. (Cl. 277—25)

This is a continuation-in-part application of copending application Ser. No. 169,282, filed January 29, 1962, and entitled, "Fluid Seal."

This invention relates to a fluid seal. More particularly, the invention relates to a fluid seal of a type adaptable to seal a rotating shaft under both static and dynamic conditions. Still more particularly, the invention relates to a type of seal for sealing a rotating shaft by a positive pressure actuated seal at static conditions and by a centrifugal seal under dynamic conditions, including means whereby the static seal is removed from frictional engagement with rotating elements under dynamic conditions.

A variety of types of seals have been designed to seal rotating shafts. These designs include radial positive contact seals, labyrinth seals, axial mechanical seals and screw thread seals. Each of these have certain characteristics, but include certain limitations. For instance, the screw thread seal functions exceedingly satisfactorily under dynamic conditions but cannot be effectively designed to prevent all leakage under static conditions. The axial mechanical seal and the radial positive contact seal function satisfactorily under static conditions but under high speed rotary dynamic conditions the continuous frictional contact of elements of the seal with moving parts result in eventual failure.

It is therefore an object of this invention to provide a seal for a rotating shaft providing means to prevent the leakage of fluid past the seal in either dynamic or static conditions in a manner whereby frictional contact and thereby wear of the seal components is reduced to a minimum.

A more particular object of this invention is to provide an automatic disengaging dynamic fluid seal including positive sealing means under static conditions and dynamic sealing means under dynamic conditions and including disengagement means whereby the static seal means is disengaged in the transition from static to dynamic conditions.

Another object of this invention is to provide a positive static seal for rotating shafts including automatic disengaging means for disengaging the static seal under dynamic conditions.

Another object of this invention is to provide a dynamic seal for sealing a rotating shaft including a dynamic seal disc adaptable to impart centrifugal force to the fluid to prevent the escape of fluid past the seal and including a conjoint automatically disengaging static seal means.

These and other objects and a better understanding of the invention may be had by referring to the following description and claims taken in conjunction with the attached drawings in which:

FIGURE 1 is a cross-sectional view of the seal of this invention.

FIGURE 2 is a partial view of the static seal portion of the invention showing the attitude of the resilient seal means under static conditions.

FIGURE 3 is a partial view of the static seal portion of this invention showing the attitude of the resilient seal member under dynamic conditions.

Figure 4:
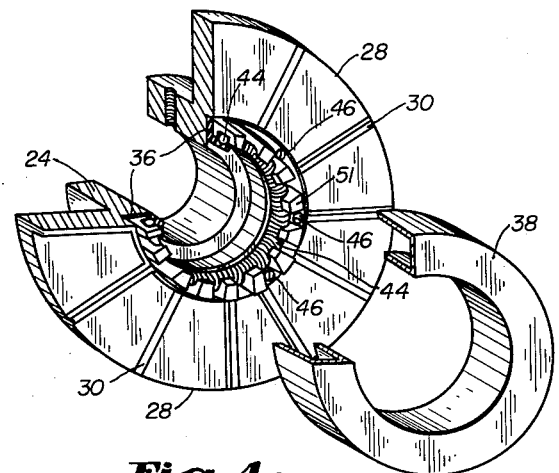
FIGURE 4 is an exploded view shown partly in cross-section of the dynamic seal disc, spring guide, spring, resilient seal and seal cup of the invention.
Figure 5:
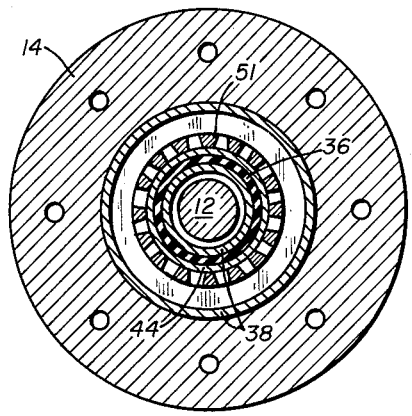
FIGURE 5 is a reduced scale cross-sectional view of the seal taken along the line 5—5 of FIGURE 1.

This invention may be described as an automatic disengaging dynamic seal. More particularly, but not by way of limitation, this invention may be described as an automatic disengaging dynamic seal for sealing a rotating shaft, said shaft rotatably positioned in an opening in a liquid restraining wall, comprising a dynamic seal disc supported by said shaft axially thereof, said disc positioned in close proximity to said wall whereby rotation of said shaft and thereby said disc centrifugally expels said fluid from said opening; and a static seal means, said static seal means comprising a cylindrical resilient seal member supported at one end thereof to said disc, said resilient seal member supported coaxially of said shaft, a cylindrical seal cup supported to said wall coaxially of said shaft, said resilient seal member having sealably frictional engagement with said seal cup, said resilient seal member disengageable from said friction engagement with said seal cup by centrifugal distortion thereof upon the rotation of said shaft.

Referring now to the drawings and first to FIGURE 1, the seal of this invention is indicated generally by the numeral 10. A shaft 12 extends through a liquid barrier wall 14 having an opening 16 within which the shaft 12 rotates. The liquid barrier wall 14 may be compared to the housing of a pump with the shaft 12 to the right of the seal 10 being within the housing to engage the pump components. The shaft 12 to the left of the seal 10 may be considered as being outside of the liquid barrier wall 14 as it may extend to connect to a power source. Thus the liquid barrier wall 14 retains fluid under pressure to the right of seal 10, which fluid tends to escape past shaft 12 through opening 16.

This invention provides a seal for a rotating shaft adaptable to seal the shaft under both static and dynamic conditions. By static conditions is meant the state wherein the shaft is not rotating, or is rotating at a speed below the normal speed at which the shaft rotates when in use. By dynamic conditions is meant the state wherein the shaft is rotating at or near its normal operating speed.

The seal of this invention may be basically divided into two portions designated as a dynamic seal portion 18 and a static seal portion 20. The dynamic seal portion 18 consists of a dynamic seal disc 22 having an integrally formed hub portion 24 by which the disc is affixed to shaft 12 by means of set screws 26. Dynamic seal disc 22 may be affixed to shaft 12 by any of the other normally used means of supporting a hub to a shaft. Integrally formed with hub 24 is a circular, flat impeller portion 28. The dynamic seal disc 22 may then be said to be comprised of hub portion 24 and impeller portion 28. The impeller portion 28 serves in the manner of a centrifugal pump. When shaft 12 is rotated, the dynamic seal disc 22, by action of impeller portion 28, forced fluid outwardly and away from opening 16.

In one embodiment of the dynamic seal disc 22, as shown in FIGURE 4, the impeller portion 28 is provided with radially extending vanes 30 which improve the effectiveness of the impeller portion to expel fluid away from opening 16. The speed of revolution of shaft 12 required to prevent leakage of fluid past the liquid barrier wall 14 by the effect of dynaimc seal disc 22 depends on several factors such as the pressure of the impeller portion 28, and the efficiency of the vane arrangement 30 and the proximity of the dynamic seal disc 22 to wall 14. These, of course, are design parameters which will vary according to the application required of the seal.

Figure 6:
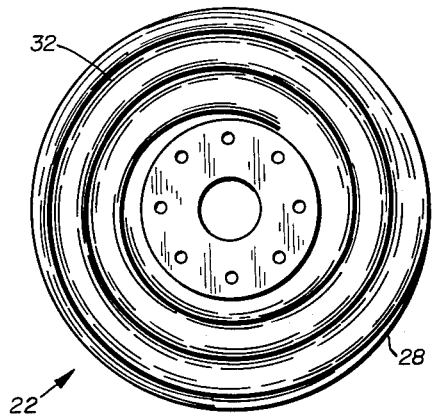
FIGURE 6 is a plan view of an alternate arrangement of the dynamic seal disc of this invention.

An alternate arrangement of the dynamic seal disc 22 is shown in FIGURE 6. In this arrangement, the vanes are eliminated and instead a spiral groove 32 is formed in the face of the impeller portion 28. The spiral groove 32, when shaft 12 rotates, conducts liquid, by a combination centrifugal and screw thread effect, away from the shaft opening 16.

The function of dynamic seal portion 18 of the seal of this invention is to prevent the flow of fluid from within an enclosure through an opening 16 under dynamic conditions. For a seal to be completely effective it must seal against fluid passage for both dynamic and static conditions. As previously mentioned, many types of seals are available which will seal under static conditions, such seals ordinarily being of the type involving the direct frictional contact of a sealing member between a rotative and nonrotative part so that a closed engagement is attained by a rubbing surface. A novel portion of this invention includes the provisions of a static seal which automatically disengages from all frictional or rubbing contact under dynamic conditions.

Referring again to FIGURE 1, the static seal, indicated generally by the numeral 20, includes a resilient cylindrical seal member 36 made of a material such as leather, rubber or plastic; a seal cup 38; a cylindrical spring guide 40; and a spring 44.

The resilient seal member 36 is supported at one end against dynamic seal disc 22 by spring guide 40 which is affixed to the dynamic seal disc 22 with screws 46. The cylindrical resilient seal member 36 extends coaxially with the shaft 12 and includes a sealing face 48 which engages the coaxial sealing surface 50 of seal cup 38.

Positioned around and substantially directly above the sealing surface 48 of the resilient seal member 36 is spring 44 which, under non-rotative conditions, constrains the sealing face 48 of the resilient seal member 36 into positive engagement with the sealing surface 50 of the seal cup 38. Under nonrotative conditions positive engagement of the resilient seal member 36 is thereby insured to prevent fluid leakage.

The contact of sealing face 48 of the resilient seal member 36 with the interior surface 50 of seal cup 38 presents a rubbing surface which is typical of positive acting static seals. By proper selection of materials, a certain amount of rubbing of the sealing surfaces is permissible, however, seals which require the continuous rubbing of the sealing surfaces are subject to failure due to the inevitable processes of attrition. To preclude this type of failure, this invention provides means whereby the static seal is disengaged when sufficient velocity of rotation of shaft 12 occurs to provide dynamic sealing by means of sealing disc 22.

To provide disengagement of the static seal portion 20 during dynamic conditions, resilient seal member 36 is constructed so that rotation will, by centrifugal force, distort or move the resilient seal member away from all frictional contact. The action of the resilient seal member 36 by the effect of rotation of shaft 12 can best be seen by referring to FIGURES 2 and 3. FIGURE 2 depicts static conditions of the seal. By the tension of spring 44, the sealing face 48 is urged into engagement with the sealing surface 50 of resilient seal cup 38. In addition to the tension of spring 44, it can be seen that the resilient seal member 36 is maintained in sealing engagement with the seal cup 38 by the hydrostatic pressure of fluid within the enclosure 14 as represented by the small arrows.

As shaft 12 rotates, a speed is reached at which the dynamic seal portion 18 releases the hydrostatic fluid pressure on the resilient seal member 36 and the centrifugal force of rotation of the resilient seal 36 overcomes the tension of spring 44 so that resilient seal member 36 is distorted away from frictional engagement with the sealing surface 50 of the seal cup 38, as depicted in FIGURE 3.

Referring to FIGURES 1 and 4, it can be seen that outwardly extending fingers 51 formed on spring guide 40 extend to restrict the movement of the spring 44 and resilient seal member 36. A groove 52 is formed in the fingers 51 to receive spring 44. Groove 52 functions to maintain the spring 44 within its proper position so that when the speed of rotation of shaft 12 is reduced and centrifugal force on resilient seal member 36 diminishes, spring 44 will properly engage the resilient seal member 36 to return it to positive engagement with seal cup 38.

Spring guide 40 is shown in FIGURES 1 and 4 having integrally formed extending fingers 51. This is by way of example only as the spring guide 40 may be of solid construction of any configuration providing groove 52 to receive spring 44.

The function of spring 44 is to make certain that under static conditions sealing face 48 of resilient seal member 36 positively engages the sealing surface 50 of the seal cup 38. Hydrostatic fluid pressure, as indicated in FIGURE 2, is sufficient, under usual operating conditions, to maintain the resilient seal in sealing contact with surface 50 after positive contact is insured by spring 44. When rotation of shaft 12 begins, the effect of the centrifugal force induced by impeller portion 28 of the dynamic seal disc 22 removes fluid pressure from the static seal portion 20. Thus, as the shaft 12 begins to rotate, the static fluid pressure on the resilient seal member 36 diminishes and at a predetermined speed of rotation of shaft 12 the static pressure on the resilient seal member 36 is eliminated altogether as fluid is pulled away from the static seal 20 and forced outwardly by the effect of the centrifugal impetus applied by impeller portion 28. It is important, to extend the useful life of the seal of this invention, that the resilient seal member 36 disengage from frictional contact with surface 50 of seal cup 38 as soon as the removal of fluid pressure on the seal permits. Therefore it is necessary that spring 44 disengage tension on the resilient seal member 36 when a speed of rotation is obtained sufficient to remove hydrostatic pressure from the resilient seal member 36. In order to relieve the tension applied by spring 44 under dynamic conditions, internal weights (see FIGURES 7 and 8) 54 are placed within spring 44. Weights 54 are sized to provide, at a predetermined speed of rotation, sufficient centrifugal force to relieve the tension of spring 44 on the resilient seal member 36. By proper design this occurs at substantially the same time that hydrostatic pressure is removed from the static seal by the effect of dynamic seal disc 22.

Resilient seal member 36 may be formed so that under static conditions the sealing face 48 is constrained in frictional sealable engagement with seal cup 38 and under dynamic conditions is distorted by centrifugal force so that disengagement of the frictional sealing surfaces occurs. Thus, spring 44 is not required to fullfil the basic concept of the invention when under ideal conditions seal member 36 is composed of a material having pliability permitting deformity to attain disengagement with seal cup 38 under dynamic conditions, while maintaining resiliency to close to positive sealing engagement with seal cup 38 upon return to static conditions. However, under most conditions and utilizing commonly available materials for the formation of resilient seal member 36, the utilization of spring 44 is considered desirable.

It can be seen that seal cup 38 may be integrally formed with wall 14, or it may be formed of a variety of configurations, the only requirement to fulfill the principles of this invention are that the sealing surface 50 of the seal cup 38 and the sealing face 48 of resilient seal member 36 be positionably related such that rotation of shaft 12 causes resilient seal member 36 to distort, by the effect of centrifugal force, out of engagement with seal cup 38.

The sealing face 48 of seal member 36 is shown in FIGURE 1 as having a flat configuration whereas FIGURES 2 and 3 show the sealing face 48 as V-shaped. These configurations are merely exemplary as the shape of the sealing face 48 will vary according to the design conditions. The invention is not limited to any specific sealing face configuration.

Figure 7:
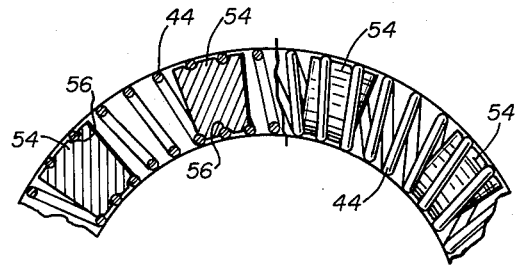
FIGURE 7 is an enlarged partial view of the spring utilized in the static seal portion of the invention shown partly in cross-section.

Weights 54 may be retained within spring 44 in a variety of ways. One method is illustrated in FIGURE 7 in which the weights 54 have a nominal external diameter larger than the internal diameter of the spring. In addition, as illustrated, weights 54 may be provided with spiral grooves 56 in the external surface receiving spring 44 as a further means of insuring proper weight spacing.

Figure 8:
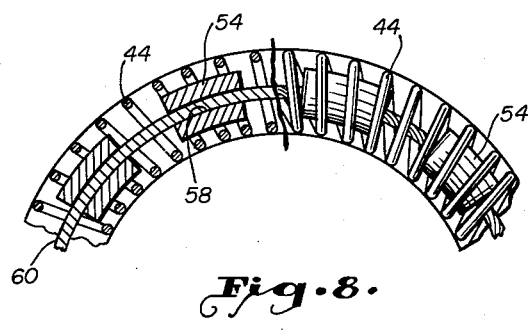
FIGURE 8 is an enlarged partial cross-sectional view of the spring as illustrated in FIGURE 7, disclosing an alternate means of maintaining weights within the spring in spaced relationship.

FIGURE 8 illustrates another method of retaining the weights in spaced position within the spring. In this embodiment, each weight 54 has an axial opening 58 therethrough. A cable 60 extends through each opening 58. Each weight 54 is secured to the cable 60, such as by epoxy bonding so that the weights are maintained in spaced relationship. The cable 60 may be of an elastomer material, permitting expansion as the spring expands, or the cable may be of an inelastic material and of a length, as illustrated, permitting expansion of the spring. The illustrations of FIGURES 7 and 8 are exemplary as other means of retaining the spaced apart weights within the spring are readily apparent.

This invention provides a seal of a unique design which insures complete sealing of a rotary shaft for both static and dynamic conditions. The seal has the further unique characteristic that the static portion of the seal is in complete disengagement during the rotation of the sealed shaft so that wear on the seal is reduced to a minimum and occurs only when the rotation of the shaft is initiated, during the acceleration of the shaft, or when it is terminated, during the deceleration of the shaft. The provision of spring 44, with internally positioned weights 54, provides a means of assuring positive engagement of the resilient seal member 36, but at the same time provides means whereby the spring 44 will release tension when sufficient effect of the dynamic portion of the seal incurs to relieve all hydrostatic fluid pressures on the static seal.

This invention has been described with a certain degree of particularity but it is manifested that many changes may be made in the details of construction and the arrangement of components without departing from the spirit and scope of this disclosure.

What is claimed:
1. A seal for sealing a shaft rotatably supported in an opening in a liquid barrier wall, said seal characterized by sealing the shaft under both static and dynamic conditions, comprising:
   a radial disc member affixed to the shaft having one face thereof in close proximity to the liquid barrier wall, said disc member adaptable to centrifugally expel liquid away from the opening when the shaft is rotated;
   a tubular centrifugally distortable resilient seal member supported coaxially of the shaft and affixed at one end thereof to said disc member;
   a tubular seal cup member supported coaxially of said shaft and sealably affixed at one end thereof to the liquid barrier wall, a portion of said seal cup member extending telescopically within at least a portion of said tubular resilient seal member, said seal member normally sealably contacting said telescoped portion of said tubular seal cup member at the full circumference thereof;
   a circular coiled spring member supported coaxially of said tubular resilient seal member and in full circumferential contact with the exterior surface thereof to normally constrain said member in sealing contact with said seal cup member; and
   a multiplicity of weights supported at spaced intervals within said coiled spring member, said weights adaptable to centrifugally extend said spring member as said seal member is rotated by the shaft whereby said spring releases constraint on said resilient seal member at a predetermined speed of rotation.

2. A seal according to claim 1 including a tubular spring guide member supported at one end thereof to said disc member, said spring guide member telescopically extended coaxially of said tubular resilient seal member and said spring member, said spring guide member having a groove formed in the internal surface thereof adaptable to receive said spring as said spring is centrifugally expanded.

References Cited by the Examiner

UNITED STATES PATENTS

| 2,478,649 | 8/1949 | Wightman | 277—25 |
| 2,665,929 | 1/1954 | Sawyer | 277—25 X |
| 2,781,209 | 2/1957 | Jacobs. | |

LAVERNE D. GEIGER, *Primary Examiner.*